United States Patent [19]

Dugger

[11] Patent Number: 4,813,827
[45] Date of Patent: Mar. 21, 1989

[54] POWER CASE TRIMMER

[76] Inventor: William D. Dugger, 16403 E. Bainbridge, Fountain Hills, Ariz. 85268

[21] Appl. No.: 200,467

[22] Filed: May 31, 1988

[51] Int. Cl.$^4$ .......................... B23B 5/16; B23P 15/22
[52] U.S. Cl. ..................................... 408/211; 29/1.32; 86/24; 86/44
[58] Field of Search .................. 29/1.3, 1.32; 408/211; 409/138, 140; 7/157; 86/24, 25, 44

[56] References Cited

U.S. PATENT DOCUMENTS

| | | | |
|---|---|---|---|
| 3,555,959 | 1/1971 | Lee | 86/24 X |
| 3,636,812 | 1/1972 | Nuler | 86/24 X |
| 3,818,563 | 6/1974 | Beaulieu | 29/1.32 |
| 4,178,189 | 12/1979 | Mancini et al. | 29/1.3 X |
| 4,405,269 | 9/1983 | Hertzler | 408/211 |
| 4,742,606 | 5/1988 | Burby et al. | 29/1.32 |

*Primary Examiner*—Gil Weidenfeld
*Assistant Examiner*—Steven C. Bishop
*Attorney, Agent, or Firm*—Richard R. Mybeck

[57] ABSTRACT

A battery operated, portable hand controlled cartridge case trimmer which indexes on the entire length of the case and permits resizing based on the total explosive expansion of the cartridge. A special clamping means secures the cartridge case for trued engagement by a cutter assembly having a cutting edge for length, a cutting edge for inside chamfer and a cutting edge for outside chamfer.

18 Claims, 2 Drawing Sheets

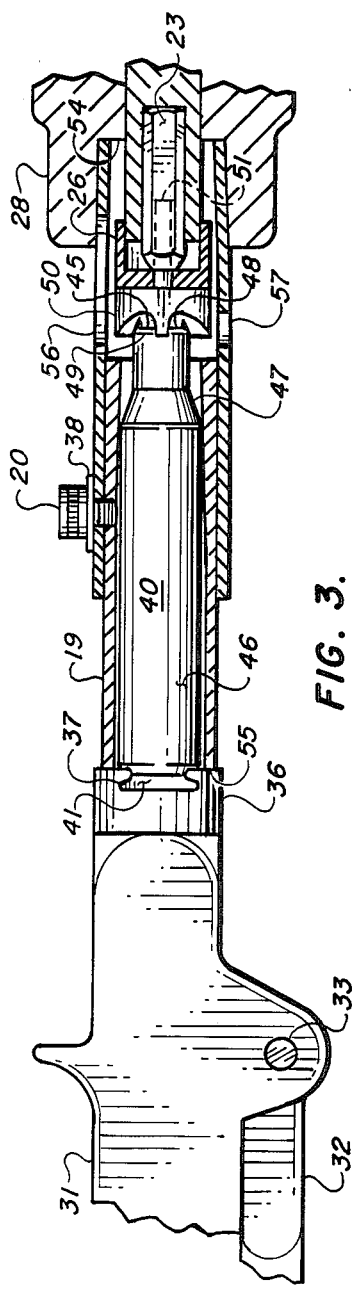
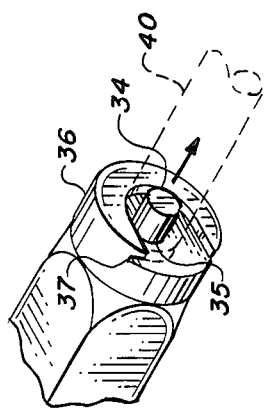
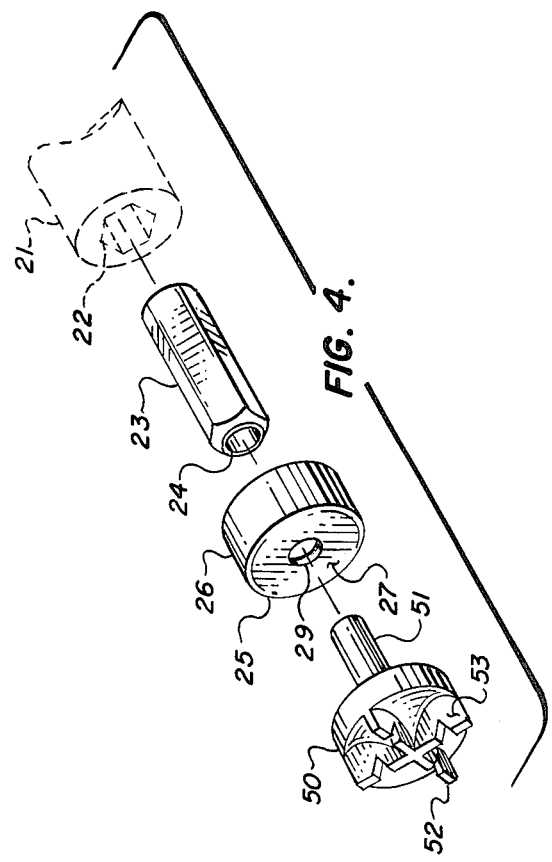

POWER CASE TRIMMER

INTRODUCTION

The present invention relates generally to a power case trimmer for use in connection with the reloading of rifle and pistol cartridges and more particularly to a battery operated, portable hand controlled cartridge case trimmer for redimensioning spent cartridge cases to safe limits preparatory to reloading and reuse.

BACKGROUND OF THE INVENTION

The firing of a cartridge in a rifle or other firearm creates tremendous gas pressure within the cartridge case which results in the forceful expulsion of the bullet or projectile inserted in the cartridge case. The explosive force of firing a cartridge, depending on the cartridge, is generally somewhat above 25,000 pounds per square inch and is created so rapidly that the internal pressure generated also expands the cartridge case within the firing chamber of the firearm which retracts only slightly after the pressure is fully released.

Thus the spent cartridge case is stretched, that is, it is both elongated and expanded in diameter. Both of these distortions must be corrected if the cartridge case is to be reloaded for reuse. Reloading of larger caliber cartridges is a popular pastime because the cost of reloading spent cartridges is only a fraction of the cost of new ammunition. Further, the auto-reloading process enables the shooter to devise special loads which are not available in commercial ammunition.

The reloading process begins by first removing the spent cartridge primer and cleaning the case. Thereafter, the cartridge case diameter is resized using a die of correct dimensions and drawing the die forcibly over the cartridge case using a properly designed press. Thereafter, retrimming of the case length is necessary because the case was elongated in the firing process and if it is not trimmed to the proper length, it can cause dangerously high head pressures when reloaded and fired, especially in those cases where maximum powder loading is employed to produce higher muzzle velocities.

The retrimming of the resized spent cartridge returns the stretched cartridge case to its original dimensions and permits the refurbished cartridge to be safely reloaded and used.

Gracey (U.S. Pat. No. 4,686,751) is the most recent to address the problem of trimming spent cartridges for reloading and reuse. However, Gracey's device suffers from two principal defects, namely, it does not accurately redimension the cartridge for reuse because it only factors the expansion occurring between the cartridge shoulder and the cartridge mouth into its trimming operation thereby ignoring the expansion of the cartridge body and leaving the expansion of that portion as an error in the overall sizing; and because Gracey requires a permanent work bench location, to which his device is bolted, in order to function thereby leaving a vast void for those who would prefer to have an accurate case trimmer which is readily transported with the shooter and can be operated manually anywhere the sportsman chooses, irrespective of work benches or electric power source.

Furthermore, the prior art devices required the operation to hold the cartridge case by hand to prevent it from rotating in response to the rotary cutter which often resulted in great hand fatigue and severe cramping of the hand muscles.

It is toward the elimination of these prior art problems that the present invention is directed.

BRIEF SUMMARY OF THE INVENTION

The present invention relates to a portable manually controlled battery operated cartridge case trimmer which trims resized spent cartridges to exact length while simultaneously chamfering the inner and outer leading edges thereof with a cutting die maintained in true round with the trimmer and a cartridge case uniformly centered therewithin. Portable vise means secure the cartridge case relative to the cutter to permit sizing relative to the total elongation of the casing rather than just a portion thereof.

Accordingly, a principal object of the present invention is to provide an improved case trimmer which obtains a degree of accuracy, both as to length and as to round which heretofore was unobtainable using prior art devices.

Another object of the present invention is to provide an improved cartridge case trimmer which can be carried with the shooter for use in any desired location and which does not require a work bench to be useful or effective.

A further object of the present invention is to provide a new and improved cartridge case trimmer having a unique holding assembly in association therewith to eliminate the finger cramps and hand fatigue heretofore associated with prior art trimmers.

Still another object of the present invention is to provide a new and improved cartridge case trimmer which produces a trimmed case having a chamfered mouth which eliminates burrs and allows for easier bullet insertion thereinto.

These and still further objects as shall hereinafter appear are readily fulfilled by the present invention in a remarkably unexpected manner as will be readily discerned from the following detailed description of an exemplary embodiment thereof especially when read in conjunction with the accompanying drawing in which like parts bear like numerals throughout the several views.

BRIEF DESCRIPTION OF THE DRAWINGS

In the drawing:

FIG. 3 is a cross section taken on line III—III of FIG. 2;

FIG. 4 is an exploded showing, partially in phantom, of a die-cutter subassembly in accordance with the present invention; and FIG. 5 is a fragmentary showing, partially in phantom, showing the locking engagement between the cartridge head and the head clamp in the practice of the present invention.

DESCRIPTION OF THE PREFERRED EMBODIMENTS

Figure 1:
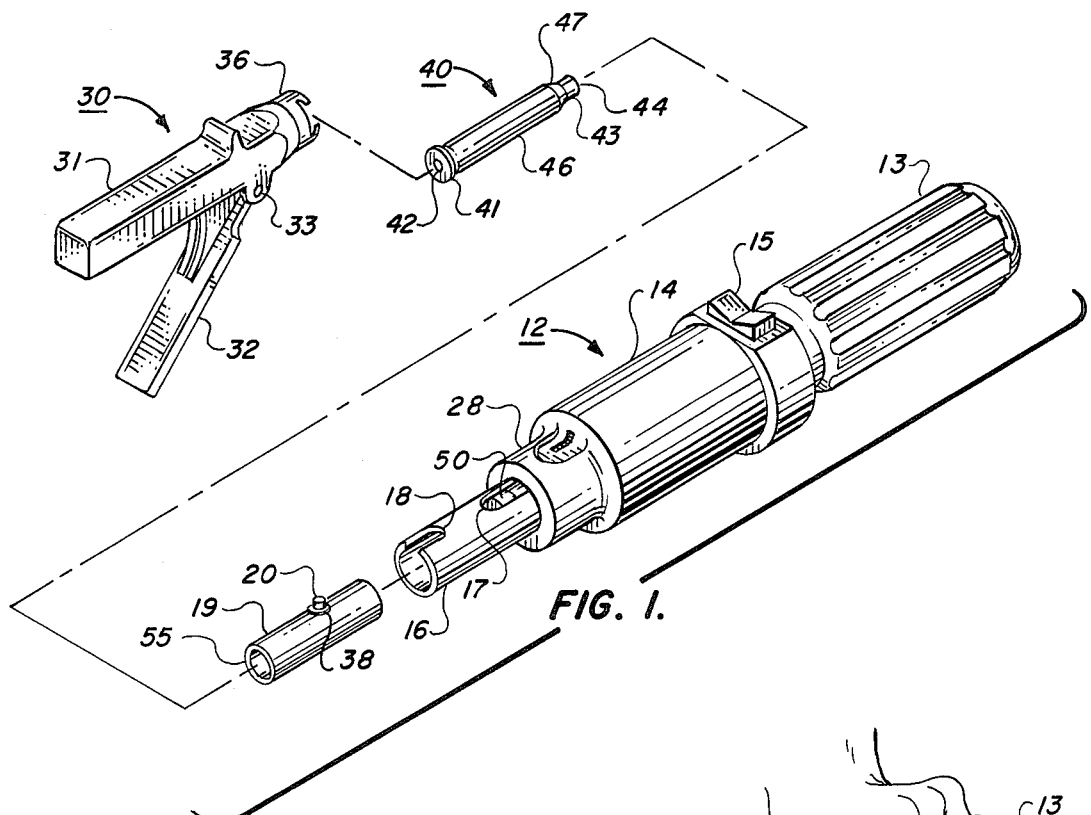
FIG. 1 is an exploded isometric showing of the several elements making up a portable cartridge case trimmer embodying the present invention.

In FIG. 1, a cartridge case trimmer assembly embodying the present invention is identified by the general reference numeral 10.

Each assembly 10 comprises a rotary drill assembly 12 having a cylindrical sleeve 16 disposed therein and into which cartridge holder 19 is axially inserted for a purpose to be hereinafter described in detail.

A special clamping means or hand clamp 30 is adapted to receive and secure a suitable cartridge case 40 therein for direction into cartridge holder 19 in the operation of assembly 10 as will be hereinafter described in more detail in conjunction with FIGS. 2, 3, 4 and 5.

Rotary drill assembly 12 comprises a handle 13 axially extending from the body portion of housing 14 in which a conventional battery and battery-operated direct current rotary motor (not shown) are disposed to rotate the drive shaft thereof (not shown) in response to the activation of switch 15.

Figure 2:
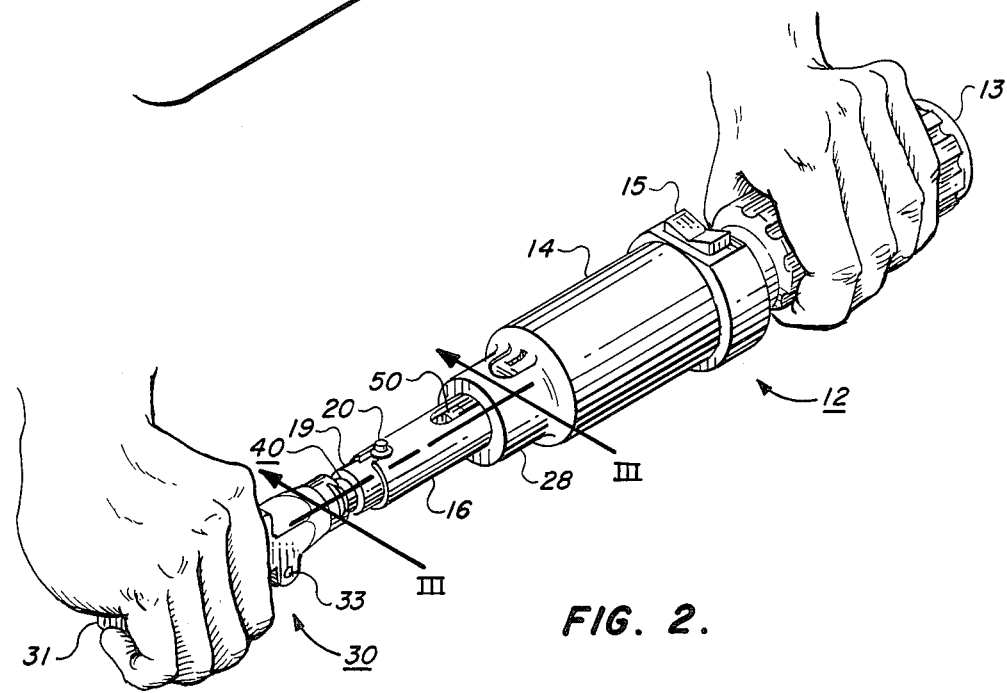
FIG. 2 is an isometric view of the portable cartridge case trimmer of the present invention while in use.

Referring to FIGS. 1 and 2, a suitable sleeve 16 having a first axially extending slot 17 and a second axially extending slot 18 disposed in the housing thereof and extending in opposite direction to each other is axially inserted into housing 14 and becomes a permanent part of rotary drill assembly 12. Tubular cartridge holder 19 has a radially extending set screw 20 disposed therein. Set screw 20 passes through annular spacer 38 which is circumscribed thereabout. Cartridge holder 19 is axially insertable into sleeve 16 with screw 20 extending through slot 18 until a preselected dimension is reached whereupon screw 20 is tightened to clamp cartridge holder 19 and spacer 38 to sleeve 16 in the preselected position to insure that the desired overall case length is maintained. As shown, the position of cartridge holder 19 in sleeve 16 can be telescopically adjusted to accommodate cartridges requiring different overall lengths.

Referring now to FIGS. 2, 3 and 4, in which further details of the rotary drill assembly 12 are shown, a drill chuck 21 is formed on the previously described drive shaft and is provided with a hexagonal opening 22 into which hexagonally shaped connector means 23 is axially inserted. Connector means 23 in turn has a cylindrical opening 24 defined on the axial center line thereof for a purpose which will be described hereafter.

A cylindrical collar member or spacer 25 having an annular axially extending outer wall 26 is mounted over connector means 23, which as described was first inserted into opening 22 of drill chuck 21, in circumscription about cylindrical drill chuck 21 and centered so that the central opening 29 defined in the leading surface 27 of spacer 25 is truly and axially aligned with opening 24 in connector means 23 for reasons which shall now be described in connection with die cutter 50.

A die cutter 50 having a cylindrical shaft 51 extending therefrom and a three way cutter head 52 mounted thereupon is installed by the axial insertion of cutter shaft 51 through the axially aligned center opening 29 in spacer 25 and the central opening 24 in connector means 23 to complete the assembly of that portion of drill assembly 12.

Thereafter, cartridge holder 19 is telescopically inserted into sleeve 16 a sufficient distance to establish a preselected length for the particular cartridge 40 being trimmed. When that location is determined, set screw 20 is tightened down until annular spacer 38 firmly engages the outer surface of sleeve 16 and further movement of cartridge holder 19 relative to sleeve 16 is prevented.

A tri-cut die cutter 50 suitable for use herewith is available commercially in a variety of cartridge bores, eg., 0.223, 0.243, 0.257, 0.277, 0.284, 0.308, 30-06; 8 mm and the like from Del Ramsey MMP Company, Harrison, Ark.

The clamping means 30 which is employed to secure and direct the cartridge casing to be refurbished, will now be described.

Each clamping means 30 comprises a base member 31 and a lever member 32 connected to base member 31 through a pivot shaft 33 and operative when lever member 32 is pivoted thereabout to activate an axially extending spring biased pin member 34 in and out of an opening 35 defined in the nose portion 36 thereof. Nose portion 36 further comprises a slotted groove portion 37 adapted to receive a cartridge head 41 when slid laterally thereinto and to axially align pin member 34 with detonator receiving means 42 defined in cartridge head 41 and securely retain cartridge head 41 therewithin when lever 32 is squeezed toward base member 31 to extend pin member 34 out through opening 35 into secure engagement within the detonator receiving socket 42 defined in the center of and extending axially through cartridge head 41.

With the cartridge 40 thus firmly secured by the hand clamp 30, the operator can introduce the cartridge 40, nose 43 first, into cartridge holder 19 until resistance is felt which occurs as the leading edge 44 of the mouth 45 of the cartridge nose 43 engages cutter blade 53 whereupon switch 15 is activated and the die cutter 50 proceeds to rotate and act on cartridge case 40 to remove the excess length thereof while the operator continues to urge the cartridge 40 into the cutter 50 until the nose 36 of the hand clamp 30 abuts the adjacent end 55 of the cartridge holder 19 and the cartridge 40 can advance no further into the cutter blade 53 which positively sets the overall length of the cartridge to meet specification as to length. Slot 17 provides a ready inspection port for visually monitoring the cutting process during which the brass shavings created thereby drop out through shaving removal port 57.

As shown in FIG. 1, each cartridge 40 consists of a head 41 having a detonator pocket 42 defined centrally therein, a body portion 46, a circumscribing groove defined between the head 41 and the body portion 46, and a beveled shoulder portion 47 interposed between body portion 46 and nose portion 43. The dimension between the cartridge head 41 and the leading edge 44 of the cartridge mouth 45 now conforms exactly to the overall length of the cartridge required by "The Book" for reclaimed cartridges. (See Table I, below). At this time, the cutter completes the removal of the excess length and chamfers both the inner edge 48 and the and outer edge 49 of the cartridge mouth 45 thereby creating a cartridge 40 for refill which conforms exactly to specifications.

TABLE I

The trimmed case lengths prescribed for representative caliber firearms are as follows:

| CALIBER | CASE LENGTH (in.) |
| --- | --- |
| 0.223 | 1.750 |
| 0.243 | 2.035 |
| 0.257 | 2.223 |
| 0.277 | 2.530 |
| 0.284 | 2.490 |
| 0.308 | 2.005 |
| 30-06 | 2.484 |
| 8 MM (8 × 57) | 2.235 |

Cartridge 40 is thereafter withdrawn from within the cartridge holder 19 and removed from clamp 30 by releasing lever 32 and sliding the reclaimed cartridge 40 laterally out of slotted groove 37 in which it had been secured.

The assembly is thus ready to prepare another cartridge for refill by repeating the foregoing procedure.

In one preferred practice of the present invention, a commercially available battery driven screw driver is modified by adding a housing extension to the original device and mounting the cutting head and cartridge holder to the nose end thereof. This arrangement can likewise be adapted for a variety of cartridge sizes simply by replacing the cartridge holder and die cutter described above with others of appropriate size. The trimmer employs a rechargeable battery pack which allows up to about one hundred twenty-five (125) cartridge cases to be salvaged without a recharge.

The importance of trimming cases to the proper length and with the correct chamfers cannot be overstressed because without such exact trimming, unsafe and dangerous pressures could result by the extension of the case into the barrel which, unlike the chamber, is not designed to withstand the impact of the explosion and could shatter in the user's face.

From the foregoing, it becomes apparent that new and useful procedures have been herein described and illustrated which fulfill all of the aforestated objectives in a remarkably unexpected fashion. It is of course understood that such modifications, alterations and adaptations as may readily occur to an artisan having the ordinary skills to which this invention pertains are intended within the spirit of the present invention which is limited only by the scope of the claims appended hereto.

Accordingly what is claimed is:

1. A portable trimmer for cartridge cases comprising: a rotary drill assembly having a housing and a drill chuck extending outwardly therefrom; a die cutter assembly telescopically mounted into said drill chuck for rotation therewith; sleeve means telescopically inserted into said housing and having a distal end, a proximal end, and slot means defined in the upper surface thereof and extending axially thereinto from said distal end; cylindrical cartridge holder means telescopically insertable within said sleeve means and having a proximal end, a distal end, and adjustment means extending radially therefrom intermediate said proximal and said distal end and coactive with said slot means to guide the penetration of said cartridge holder into said sleeve member, said adjustment means being actuable to prevent the movement of said cartridge holder relative to said sleeve member when a preselected distance between said distal end of said cartridge holder and said die cutter assembly is established; clamp means for securing a cartridge case therein and directing the passage of said cartridge case into said cartridge holder for cutting engagement by said die cutter assembly; and means for selectively activating said drill assembly to rotate said die cutter assembly and remove extraneous length from said cartridge case.

2. A portable trimmer according to claim 1 in which said rotary drill assembly is battery operated.

3. A portable trimmer according to claim 1 in which said die cutter assembly comprises: connector means telescopically insertable into said drill chuck for circumscription thereby, said connector means having an axially extending opening defined on the axial center line thereof; a cylindrical spacer member disposed in abutting relationship to said connector means in circumscription about said drill chuck and having a central opening defined therethrough in axial alignment with said opening defined in said connector means; and a tri-cut die cutter having a first cutting edge for inside chamfer, a second cutting edge for length, a third cutting edge for outside chamfer and a cylindrical shaft depending therefrom for operative passage through the central openings in said spacer member and said connector means into said drill check and rotatable in response thereto.

4. A portable trimmer according to claim 1 in which said clamp means comprises a base member, a lever member pivotally attached to said base member, an axially extending pin member; and a nose portion having a central opening defined therein for ingress and egress of said pin member thereinto in response to relative movement of said lever member to said base member in response to an external force applied thereto.

5. A portable trimmer according to claim 4 in which said nose portion has a slot defined laterally therein and adapted to receive a cartridge case therein in central engagement therewith so that said pin member, when extended, enters and firmly secures said cartridge case relative thereto.

6. A portable trimmer according to claim 5 in which said cartridge case comprises a head portion and a body portion, said head portion having a detonator socket defined therein for coacting with said pin member to firmly secure said cartridge in said clamp means.

7. A portable trimmer according to claim 1 in which said cartridge holder means coacts with said clamping means to prevent said cartridge case from entering said die cutter assembly when said case length equals said preselected distance.

8. A portable trimmer according to claim 2 in which said die cutter assembly comprises: connector means telescopically insertable into said drill chuck for circumscription thereby, said connector means having an axially extending opening defined on the axial center line thereof; a cylindrical spacer member disposed in abutting relationship to said connector means in circumscription about said drill chuck and having a central opening defined therethrough in axial alignment with said opening defined in said connector means; and a tri-cut die cutter having a first cutting edge for inside chamfer, a second cutting edge for length, a third cutting edge for outside chamfer and a cylindrical shaft depending therefrom for operative passage through the central openings in said spacer member and said connector means into said drill check and rotatable in response thereto.

9. A portable trimmer according to claim 2 in which said clamp means comprises a base member, a lever member pivotally attached to said base member, an axially extending pin member; and a nose portion having a central opening defined therein for ingress and egress of said pin member thereinto in response to relative movement of said lever member to said base member in response to an external force applied thereto.

10. A portable trimmer according to claim 9 in which said nose portion has a slot defined laterally therein and adapted to receive a cartridge case therein in central engagement therewith so that said pin member, when extended, enters and firmly secures said cartridge case relative thereto.

11. A portable trimmer according to claim 10 in which said cartridge case comprises a head portion and a body portion, said head portion having a detonator socket defined therein for coacting with said pin member to firmly secure said cartridge in said clamp means.

12. A portable trimmer according to claim 2 in which said cartridge holder means coacts with said clamping means to prevent said cartridge case from entering said die cutter assembly when said case length equals said preselected distance.

13. A portable trimmer according to claim 3 in which said clamp means comprises a base member, a lever member pivotally attached to said base member, an axially extending pin member; and a nose portion having a central opening defined therein for ingress and egress of said pin member thereinto in response to relative movement of said lever member to said base member in response to an external force applied thereto.

14. A portable trimmer according to claim 13 in which said nose portion has a slot defined laterally therein and adapted to receive a cartridge case therein in central engagement therewith so that said pin member, when extended, enters and firmly secures said cartridge case relative thereto.

15. A portable trimmer according to claim 14 in which said cartridge case comprises a head portion and a body portion, said head portion having a detonator socket defined therein for coacting with said pin member to firmly secure said cartridge in said clamp means.

16. A portable trimmer according to claim 3 in which said cartridge holder means coacts with said clamping means to prevent said cartridge case from entering said die cutter assembly when said case length equals said preselected distance.

17. A portable trimmer according to claim 15 in which said rotary drill assembly is battery operated.

18. A portable trimmer according to claim 16 in which said rotary drill assembly is battery operated.

* * * * *